US009830831B2

(12) United States Patent
Shen

(10) Patent No.: US 9,830,831 B2
(45) Date of Patent: Nov. 28, 2017

(54) MOBILE HANDWRITING RECORDING INSTRUMENT AND GROUP LECTURE DELIVERY AND RESPONSE SYSTEM USING THE SAME

(75) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 26 days.

(21) Appl. No.: 13/194,848

(22) Filed: Jul. 29, 2011

(65) Prior Publication Data

US 2012/0171656 A1 Jul. 5, 2012

(30) Foreign Application Priority Data

Jan. 5, 2011 (CN) .......................... 2011 3 0001709

(51) Int. Cl.
*G09B 25/00* (2006.01)
*G09B 5/14* (2006.01)
(52) U.S. Cl.
CPC ...................................... *G09B 5/14* (2013.01)
(58) Field of Classification Search
USPC ........................................ 434/162, 350, 365
See application file for complete search history.

(56) References Cited

U.S. PATENT DOCUMENTS

| | | | | |
|---|---|---|---|---|
| 2,925,467 A * | 2/1960 | Becker | ...................... | 178/18.05 |
| 5,073,926 A * | 12/1991 | Suzuki et al. | ............. | 348/14.12 |
| 6,688,891 B1 * | 2/2004 | Sanford | ....................... | 434/365 |
| 6,775,247 B1 * | 8/2004 | Shaffer et al. | ................ | 370/260 |
| 2004/0121298 A1 * | 6/2004 | Creamer et al. | .............. | 434/322 |
| 2010/0289903 A1 * | 11/2010 | Farquharson | .............. | 348/207.1 |
| 2010/0309147 A1 * | 12/2010 | Fleizach | ............. | G06F 3/04883 345/173 |
| 2012/0045746 A1 * | 2/2012 | Lee et al. | ...................... | 434/365 |
| 2012/0064968 A1 * | 3/2012 | Youm et al. | .................... | 463/29 |
| 2014/0040765 A1 * | 2/2014 | Fung et al. | ................... | 715/748 |

* cited by examiner

*Primary Examiner* — Kesha Frisby
(74) *Attorney, Agent, or Firm* — San Diego IP Law Group LLP; Trevor Coddington

(57) ABSTRACT

Disclosed is a mobile handwriting recording instrument for use in a lecture or classroom setting that includes a writing tablet, which has a writing surface, a transmitter and a receiver. Also included is a scanning device that is operably connected to the writing tablet. The scanning device is configured for capturing two or three dimensional indicia placed within the scanning device's field of view. The writing surface is configured to display handwritten indicia thereon while simultaneously displaying an image representing the handwritten indicia remotely.

16 Claims, 18 Drawing Sheets

MOBILE HANDWRITING RECORDING INSTRUMENT AND GROUP LECTURE DELIVERY AND RESPONSE SYSTEM USING THE SAME

FIELD

The disclosed device generally relates to interactivity between a plurality of highly space and weight efficient document cameras that are each integrated with a host mobile computing device, such as a laptop computer, a tablet device, or a "smart" mobile phone.

BACKGROUND

Presentation systems in classroom or conference room settings often require a number of different electronic multimedia devices that are separately present without systematic linkage. Devices often employed include
  Document Cameras, which capture video or still images of documents or 3D objects;
  A personal computer that often acts as the hub for multiple devices to function together in a loosely connected way;
  An interactive whiteboard that allows on screen annotations to be written over images projected onto a whiteboard;
  An audience response system that collects real time feedback from the audience.

Presenters are often faced with the challenge of making all of these disparate and often complex apparatuses work together before an effective presentation can be conducted. "Plugging" all apparatuses into a personal computer can encounter multiple potential errors in the process. A system with these components is also expensive.

With respect to a document camera, it is often necessary to have a document camera or other imaging similar device on hand to capture a document image or a 3D object image and project them onto a screen so that there are target images to annotate over, or for the room to interact with. Such a document camera is almost always an item independent from the rest of the system.

Whole different sets of devices are required in order to receive real time feedback from an audience during a presentation. There is often a receiver, which is connected to a personal computer, with a number of TV remote control like devices in the hands of the audience to submit real time feedback data. The personal computer will utilize software on itself to collect feedback data through the receiver, and then gather statistics before sending the statistics as numeric or graphical reports on screen.

Personal Computers are often the center for "gluing" all pieces together, connecting the document camera, taking input from the whiteboard and sending video output to projectors for displaying images and annotations real time on screen. Users also use the personal computer as the primary tool for preparing and editing content for the presentation.

An interactive whiteboard (hereinafter referred to as "IWB") is a large interactive display that connects to a computer and projector. A computer's desktop is projected onto a whiteboard's surface and users control the computer using a pen, finger, stylus, or other device. The board is typically mounted to a wall or floor stand. IWB's are used in a variety of settings, including classrooms at all levels of education, in corporate boardrooms and work groups, in training rooms for professional sports coaching, in broadcasting studios and others. Uses for interactive whiteboards may include:
  Running software that is loaded onto the connected PC, such as a web browsers or proprietary software used in the classroom;
  Capturing and saving notes written on a whiteboard to the connected PC;
  Capturing notes written on a graphics tablet connected to the whiteboard;
  Online whiteboard usage;
  Controlling a PC from the white board using click and drag, which annotates a program or presentation;
  Using OCR software to translate cursive writing on a graphics tablet into text; and
  Using an Audience Response System so that presenters can poll a classroom audience or conduct quizzes, capturing feedback onto the whiteboard.

The majority of IWBs sold globally involve one of four forms of interaction between the user and the content projected on the whiteboard. These are an infrared scan technology, a resistive, touch-based board, an electromagnetic pen and associated software, and an ultrasonic pen. An infrared interactive whiteboard is a large interactive display that connects to a computer and projector. Movement of a user's finger, pen, or other pointer over the image projected on the whiteboard is captured by its interference with infrared light at the surface of the whiteboard. When the whiteboard surface is pressed, software triangulates the location of the marker or stylus. Infrared IWBs may be made of any material (no dry-erase markers are involved) and may be found in many settings, including various levels of classroom education, corporate boardrooms, training or activity rooms for organizations, professional sports coaching facilities, and broadcasting studios.

A touch-based IWB also involves a simple pointing device. In this case, the material of the board is important. In the most common resistive system, a membrane stretched over the surface deforms under pressure to make contact with a conducting backplate. The touch point location can then be determined electronically and registered as a mouse event. For example, when a finger is pressed on the surface, it is registered as the equivalent of a left mouse click. Again, such a board requires no special instruments. This leads to the claim of resistive systems manufacturers that such a whiteboard is easy and natural to use. It is, however, heavily dependent on the construction of the board itself.

An electromagnetic pen-based interactive IWB involves an array of wires embedded behind a solid board surface that interacts with a coil in the stylus's tip to determine the horizontal and vertical coordinates of the stylus. The pen itself usually is passive, i.e., it contains no batteries or other power source; rather, it alters the electrical signals produced by the board. For instance, when close to the surface of the board, the mouse pointer can be sensed, giving the board "mouse-over" capabilities. When it is pressed in against the board in one way, the board activates a switch in the pen to signal a mouse click to the computer; pressed in another way, contact with the board signals a click of the right mouse-button.

A Wii-based IR system was created by Johnny Chung Lee, PhD. in 2007. Lee claimed that the system "[m]akes a technology available to a much wider percentage of the population" (Speaking at Technology Entertainment and Design Conference, April 2008) by using an ordinary Wii remote control as a pointer and the IR camera on the front of the remote control as tracking device sensing light from an IR light pen. Lee produced several videos on YouTube about this system to demonstrate its operability, flexibility, and ease of use, and pointing out its modest price—the most expensive part is the infrared LED of the pen. This is an approach with a shallow learning curve since the gaming system is already familiar to many. A large programming support community may be available, both in open source and commercial offerings. However, the system cannot be used near direct sunlight, nor can it share the software of manufacturers of the IWB-types already mentioned. Certain considerations about the Bluetooth connection of the light pen also apply. Two lines of sight are involved (the controller and the pen) in the case of rear-projection.

An interactive projector IWB involves a CMOS camera built into the projector, so that the projector produces an IWB image, but also detects the position of an active IR light pen when it contacts the surface where the IWB image is projected. This solution, like the other IR whiteboard systems, can suffer from potential problems caused by 'line of sight' between the pen and the projector/receiver and does not provide mouse-over capability found in other solutions.

In some classrooms, interactive whiteboards have replaced traditional whiteboards or flipcharts, or video/ media systems such as a DVD player and TV combination. Even where traditional boards are used, the IWB often supplements them by connecting to a school network digital video distribution system. In other cases, IWBs interact with online shared annotation and drawing environments such as interactive vector based graphical websites.

Software supplied with the interactive whiteboard will usually allow a teacher to keep notes and annotations as an electronic file for later distribution either on paper or through a number of electronic formats. In addition, some interactive whiteboards allow teachers to record their instruction as digital video files and post the material for review by students at a later time. This can be a very effective instructional strategy for students who benefit from repetition, who need to see the material presented again, for students who are absent from school, for struggling learners, and for review for examinations. Brief instructional blocks can be recorded for review by students they will see the exact presentation that occurred in the classroom with the teacher's audio input. This can help transform learning and instruction.

One recent use of the IWB is in shared reading lessons. Mimic books, for instance, allow teachers to project children's books onto the interactive whiteboard with book-like interactivity.

Some manufacturers provide classroom response systems as an integrated part of their interactive whiteboard products. Handheld 'clickers' operating via Infrared or Radio signals, for example, offer basic multiple choice and polling options. More sophisticated clickers offer text and numeric responses and can export an analysis of student performance for subsequent review. One drawback with handheld clickers, however, is that an operator has to learn how to write on a tablet that provides no feedback, i.e., does not show pencil marks, while looking at whiteboard or other projection screen. This is difficult and, as such, a need exists for a tablet that operates in a manner that allows a user to visualize writing directly on the tablet while simultaneously transmitting in real time what is written on the tablet to a whiteboard or other projection screen. Because of the limitations on wireless transmission bandwidth, such operability is difficult to achieve, especially with video. Previous remedies have included a pad or "slate" wirelessly coupled to a PC, which is wired to an IWB. Again, the pad does not provide instant feedback to a user so the user must constantly refer to the whiteboard to determine if what he is writing on the pad is accurate.

A need exists for an efficient way to show the user what he's writing on the pad, possibly through the use of video transmission of what is appearing on the pad as it is being written. However, when video is transmitted, quite a large amount of information is transmitted. Every frame has multiple megabits of data. To transmit data, Wi-Fi bandwidth typically would not accommodate the necessities of transmitting real time HD video for an IWB. The only way to transmit over Wi-Fi is to provide compression on a sending end and decompression on a receiving end. However, compression compromises the integrity of the transmission.

The present system cures the drawbacks of the above mentioned systems.

SUMMARY

Several components are integrated into a new type of device for the first time:
  A tablet computer with touch sensitive screen;
  A miniaturized document camera integrated structurally and electronically with the tablet computer;
  A wireless video transmitter and receiver pair which allow remotely and wirelessly sending video from the tablet computer to a monitor (TV or Projector)
    This replaces the wireless slates used often in conjunction with interactive whiteboards connected to a PC normally;
  An audience response system receiver that is connected to the tablet computer structurally and electronically, managed by companion software to store, calculate statistics of audience response, and visually display analysis of these responses.

All four of these components are not necessary to use the present inventive system. Rather, a tablet (with or without a touch sensitive screen) and a document camera (preferably high definition) are the basic components of the system. Nonetheless, this new type of device is effectively a handheld wireless touch screen tablet with wireless video display which fulfills all functions of a traditional Interactive Whiteboard, at the same time being able to capture and display video and still images fulfilling the functions of a document camera, and allows presenters to capture and display audience responses.

By combining a classroom response system with an interactive whiteboard system, teachers can present material and receive feedback from students in order to direct instruction more effectively or else to carry out formal assessments. For example, a student may both solve a puzzle involving math concepts on the interactive whiteboard and later demonstrate his or her knowledge on a test delivered via the classroom response system. Some classroom response software can organize and develop activities and tests aligned with state standards.

Disclosed is a mobile handwriting recording instrument that has a tablet and a scanning device. The tablet has a writing surface, a transmitter and a receiver. The scanning device is operably connected to the writing tablet and is configured for capturing indicia placed within the device's field of view. The writing surface is configured to display the indicia that are being handwritten on the tablet while simultaneously transmitting an image representing the handwritten indicia to a remote location.

The scanning device is a high-definition multimedia imager and can be physically integrated with the writing surface, possibly via an extendable and flexible arm. The scanning device can capture images of two-dimensional indicia on the writing surface and can capture images of three dimensional objects placed within the scanning device's field of view. The scanning device is connectable to the tablet via a high speed data communications port within the tablet. The position of the mechanical coupling mechanism is adjustable with respect to the scanning device.

Advantageously, plugging a connector component of a document camera into a data communication port, such as a regular sized USB port, a Mini USB port, a PCMCIA port, or a FireWire port, while utilizing mechanical integration with the computing device, the weight of the computing device, and the mechanical structure of the computing device, as the stabilizing base support, eliminates the need to build a heavy base apparatus separately.

What is also advantageous is building the document camera's stand as an integral part of the mobile computing device's body structure, such as building the document camera stand in the back of the screen of a computer laptop. The orientation of the stand and of the camera can then be adjusted. Alternatively, the document camera can be built into the main body of the computing device, while still being able to extend or be pulled outside of the computing device's body through retractable mechanisms.

The tablet can be a component of a wireless telephone or other communications device, which has a touch sensitive screen. A series of mechanical buttons can be located on the tablet. These buttons would be a "snap shot" button to capture an image of two dimensional indicia or a three dimensional object, a "home" button to provide multiple menu options to a user and an "answer" button. Pressing the answer button would capture indicia, either via still images or video, for processing and/or storage in a non-transitory medium and/or send captured indicia to a remote location.

The tablet can be configured to include a text recognition component such as optical character recognition software. Similarly, the tablet can be configured to include bubble sheet recognition and evaluation software for classroom benefit in grading exams.

A classroom setting embodiment would include a group lecture delivery and response system having a first mobile instrument and a second mobile instrument. Each of the mobile instruments would have a writing surface, a transmitter and a receiver. A respective scanning device would be operably connected to each of the first mobile instrument and the second mobile instrument. At least one of the scanning devices is a high definition multimedia device. The scanning devices can be configured for capturing indicia placed within the camera's focal view and to display indicia that have been handwritten on the writing surface while also simultaneously transmitting an image representing the handwritten indicia to a remote location.

DETAILED DESCRIPTION

Figure 1:
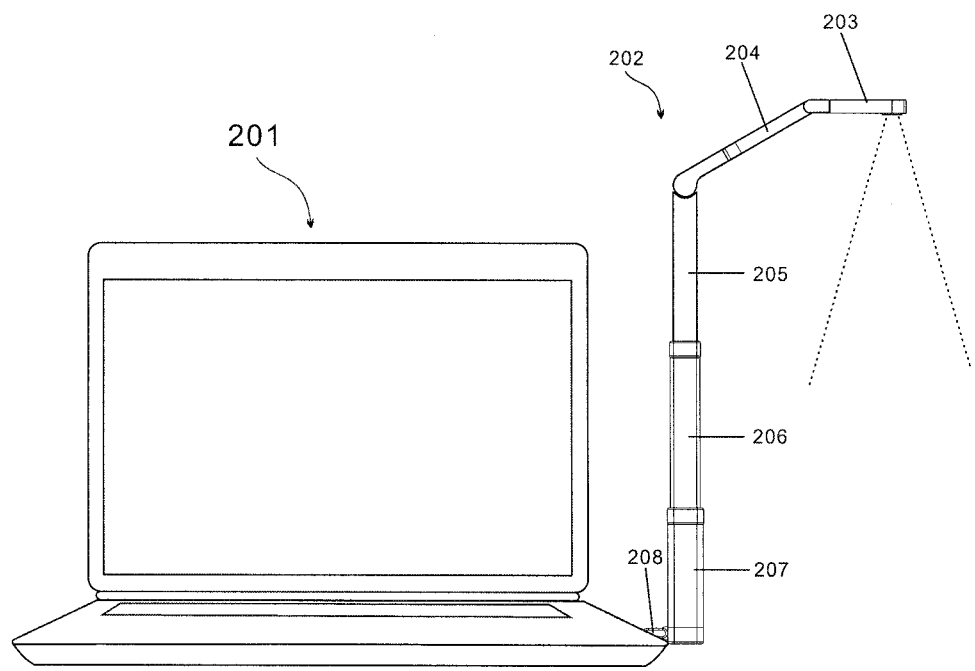
FIG. 1 is an illustration of an imaging device.

FIG. 1 is an illustration of an imaging device used in the present system. In this embodiment, a Miniaturized Camera Device (MCD) 202 is shown fully extended and attached via a USB2.0 data communications port of a laptop computer 201. The Miniaturized Camera Device 202 can fulfill image capturing functionality while also being able to retract and fold into a pocket sized container. The Miniaturized Camera Device 202 includes a Camera Housing Unit 203 (CHU), Camera Holding Swing Arm 204 (CHSA), a Top Section of the Camera Stand 205 (TSCS), a Middle Section of the Camera Stand 206 (MSCS), a Bottom Section of the Camera Stand 207 (BSCS), and an Adjustable USB Connector 208 (AUC). Camera Housing Unit 203 houses the camera lens, a high-definition multimedia interface (HDMI) imager attached through the digital imaging sensor, and immediate electronic components for encoding digital images before transmitting the data to the host computing device. The camera device's electronic components, such as CMOS or CCD sensor along with the lenses will be made to be a Printed Circuit Board (PCB) housed inside of Camera Housing Unit 203.

The high-definition multimedia imager is not necessarily limited to a connection through an HDMI port. Rather, any high definition equipment can be used and attached to a computer, tablet or other personal display means. The type of connection is not important; however, the camera or imaging device should be able to record images in high definition.

Camera Housing Unit 203 can rotate around all three axes, i.e., the front-to-back axis, or "roll"; it can rotate around the side-to-side axis, or "pitch"; it can rotate around the vertical axis, or "yaw." These degrees of freedom allow Camera Housing Unit 203 to shoot images from any angle. Camera Holding Swing Arm 204 can be the holding frame for Camera Housing Unit 203 when it is "pitched" or folded back. CHSA 204 can be further folded back before it is retracted back into the Top Section of the Camera Stand 205. The Top Section of the Camera Stand 205 can be retracted into MSCS 206, or be extended out like a section of a pull out antenna. The Middle Section of the Camera Stand 206 is partially retractable into the Bottom Section of the Camera Stand 207. The Bottom Section of the Camera Stand 207 along with the Middle Section of the Camera Stand 206 is the only potentially visible sections when the full unit is retracted. An adjustable USB Connector 208 is the connector that plugs into a high speed data communications port like a USB2.0 port housing or a High-definition multimedia imaging device.

Figure 2A:
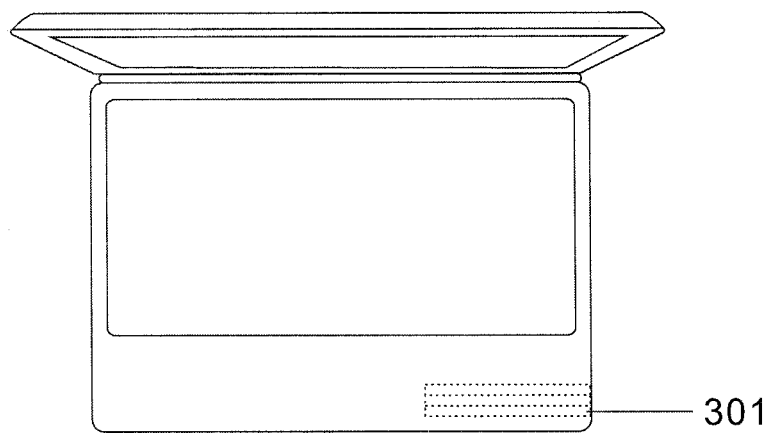
FIGS. 2a and 2b are illustrations of a first embodiment.
Figure 2B:
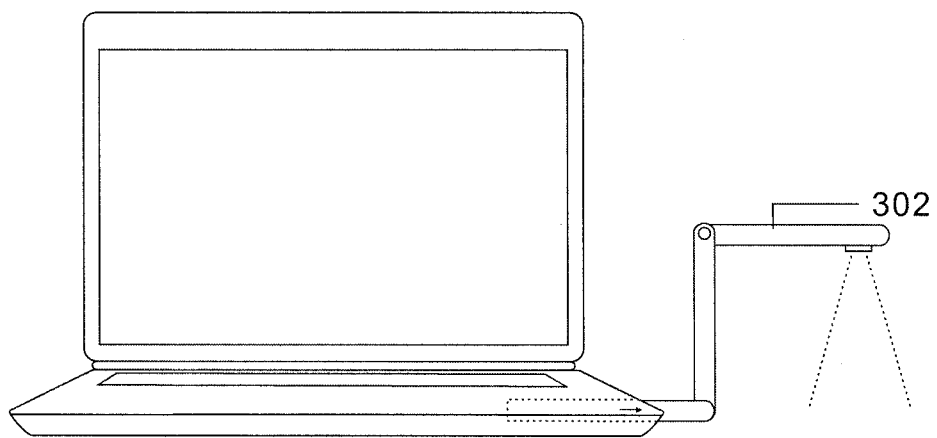

FIG. 2a is an illustration of a first embodiment of equipment used in the present system. In this embodiment, instead of attaching the camera device externally, it is integrated into the computing device's main body. An internal housing structure 301 resides inside of a laptop computer, which contains the camera fully when it is folded and retracted inside. FIG. 2b shows the camera device 302 when it is fully extended outside of the internal housing structure 301.

Figure 3A:
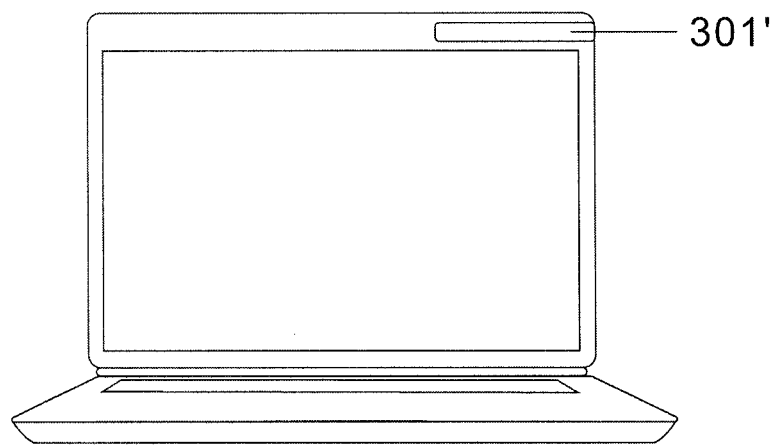
FIGS. 3a and 3b show a first alternative configuration of the first embodiment.
Figure 3B:
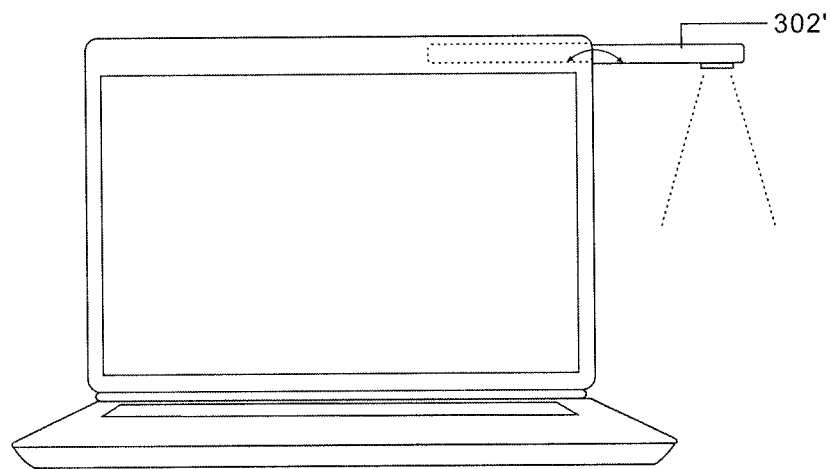

FIGS. 3a and 3b show another possible implementation of equipment of the embodiment shown in FIGS. 2a and 2b. A camera device 301' is folded and embedded into the surface area above a laptop's screen. The camera device 301' can be swung open into the position of 302" to perform image capturing functions. The camera's output connection to the host computer will be inside of the computer's body structure as well, and can be designed to connect directly to internal high speed data buses.

Figure 4A:
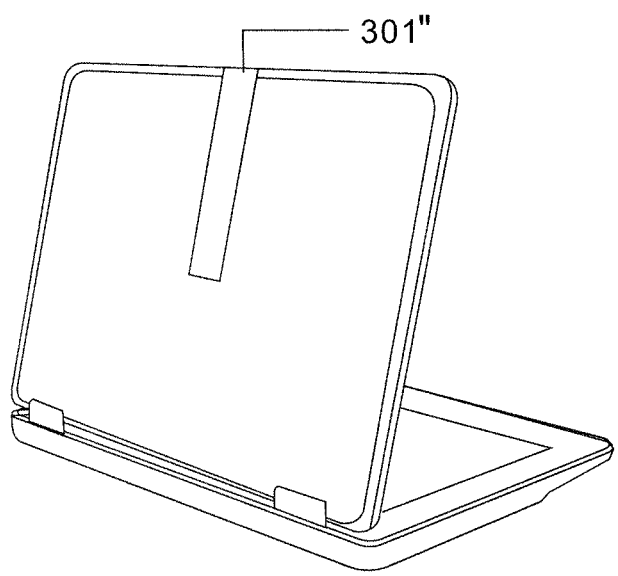
FIGS. 4a and 4b show a second alternative configuration of the first embodiment.
Figure 4B:
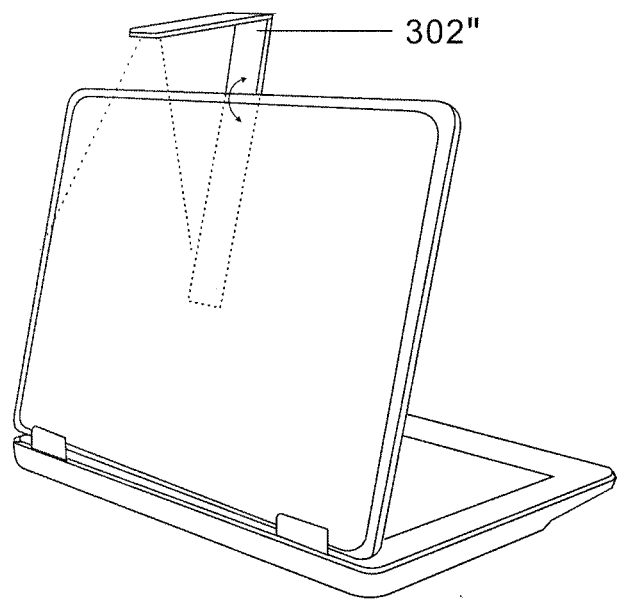

Another version of equipment the embodiment shown in FIGS. 2a and 2b is shown in FIGS. 4a and 4b. In this version camera device 301" is folded and embedded into the surface of a back cover of a laptop. The camera device 301" can be swung open into the position of 302" to perform image capturing functions. The camera device's output connection to the host computer will be inside of the computer's body structure as well, and can be designed to connect directly to internal high speed data buses.

Figure 5A:
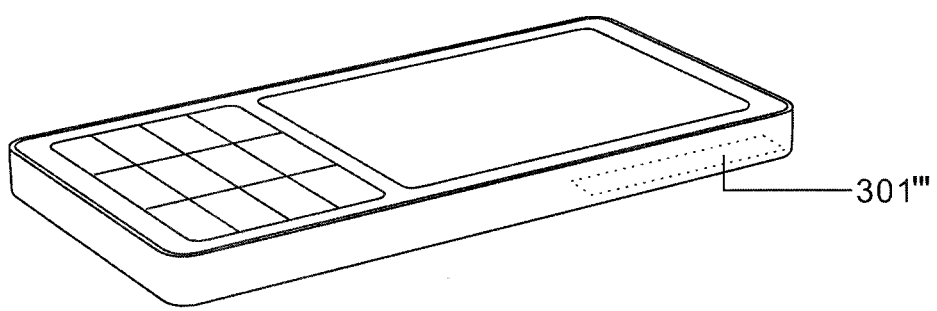
FIGS. 5a and 5b show a third alternative configuration of the first embodiment.
Figure 5B:
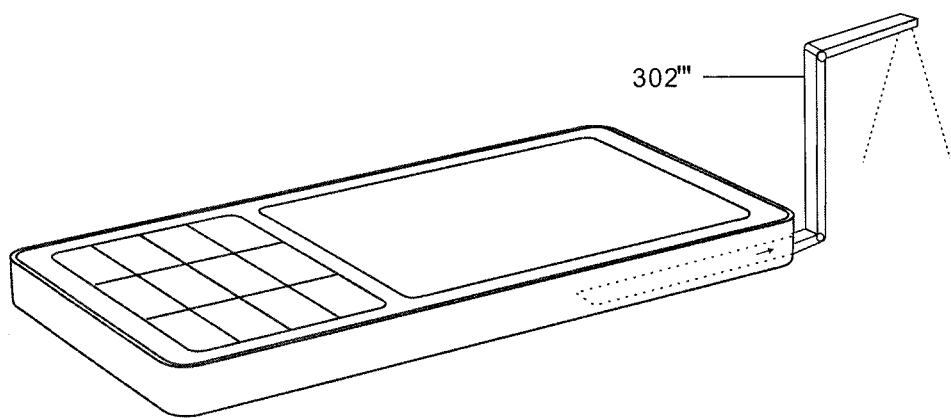

In FIGS. 5a and 5b a camera device 301"" is folded and embedded into the frame of a smart phone device. The camera device 301"" can extended and unfold into a configuration 302"" to capture images. The camera device's output connection to the host computer will be inside of the computer's body structure as well, and can be designed to connect directly to internal high speed data buses.

Figure 6A:
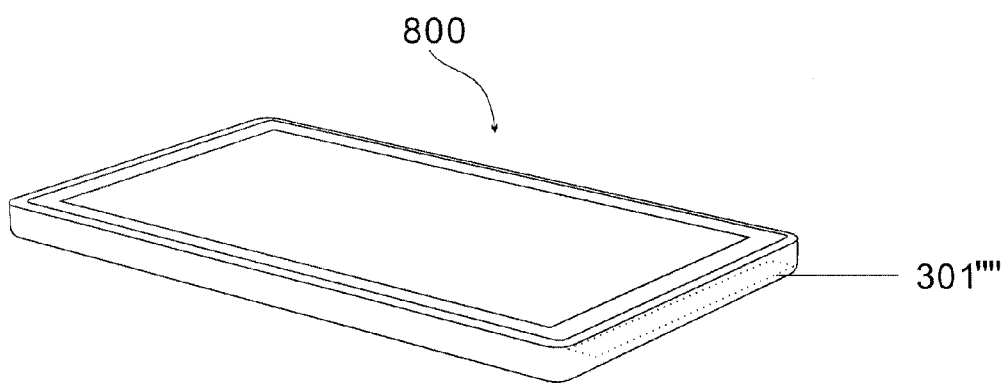
FIGS. 6a and 6b show a fourth alternative configuration of the first embodiment.
Figure 6B:
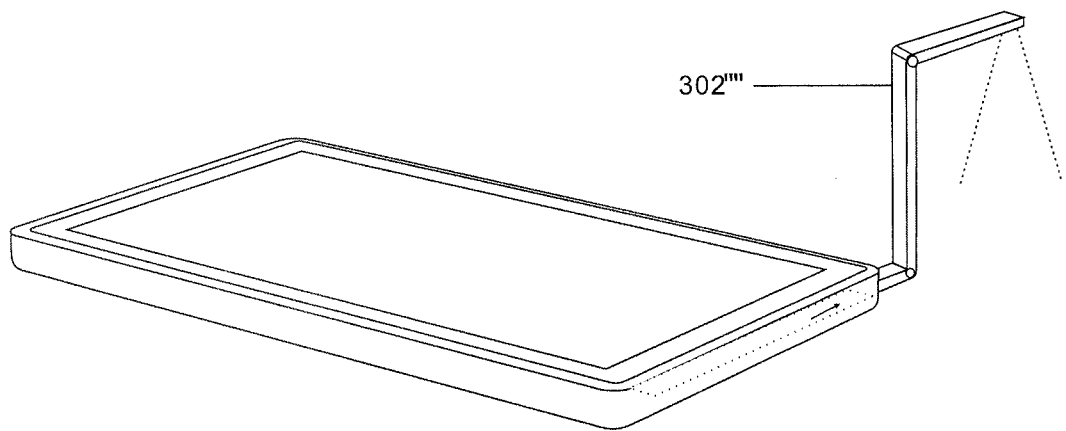

In FIGS. 6a and 6b, a camera device 301''' is folded and embedded into the frame of a tablet computer device. The camera device 301''' can extended and unfold into a configuration 302''' to capture images. The camera device's output connection to the host computer will be inside of the computer's body structure as well, and can be designed to connect directly to internal high speed data buses.

Figure 7A:
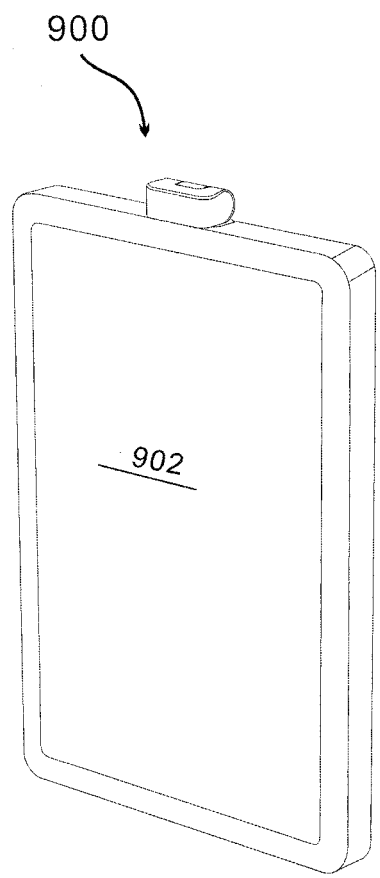
FIGS. 7a and 7b are illustrations of a second embodiment.
Figure 7B:
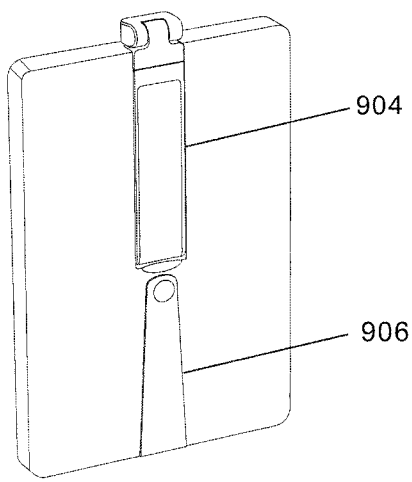

A second embodiment is shown in FIGS. 7a and 7b as a highly integrated tablet and imaging device. A front view of the tablet 900 is shown in FIG. 7a with a clear view of the writing surface 902 and a rear view of tablet 900 is shown in FIG. 7b with a clear view of an attached high-definition multimedia imaging ("HDMI") device 904 and a stabilizer 906. The tablet 900 is an independently powered mobile device. The writing surface 902 is a multi-touch user interface that allows for user interface maneuvers and live annotation. The tablet 900 includes a full featured operating system such as Android 2.0 or above, Windows Phone, Linux, etc.

The writing surface can also be used to view animated images. Typically, speakers would be integrated into the tablet 900. However, they can also be provided in the HDMI device. The tablet 900 encodes and decodes 1080P full motion video in various formats in full motion and in realtime. In non-integrated embodiments such as those described in relation to previous embodiments, the output video and audio are passed through an HDMI port or other high speed video output interface, (i.e., DVD, MiniDisplay Port, etc.) either wired or wirelessly.

Figure 8A:
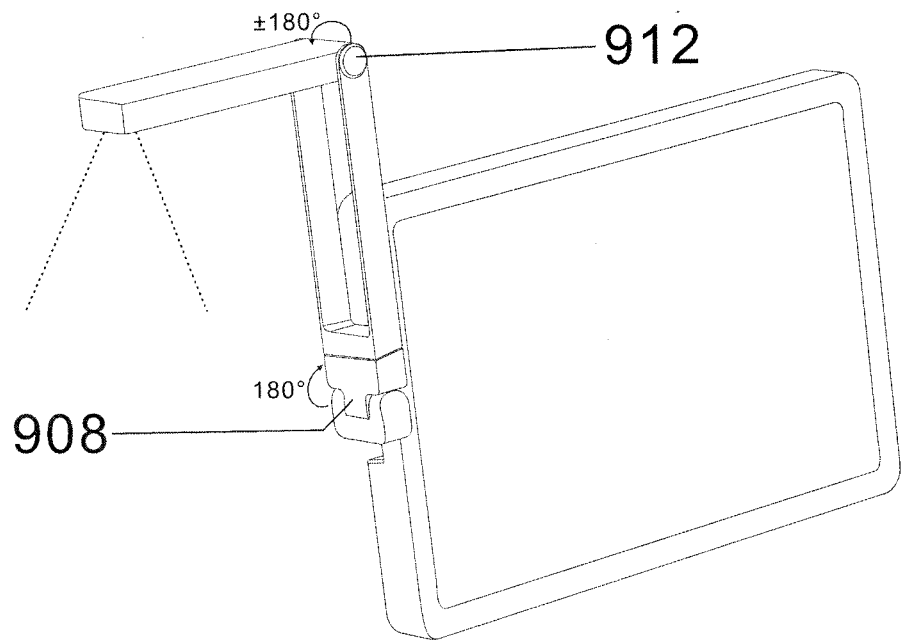
FIGS. 8a-8d show alternative configurations of the second embodiment.
Figure 8B:
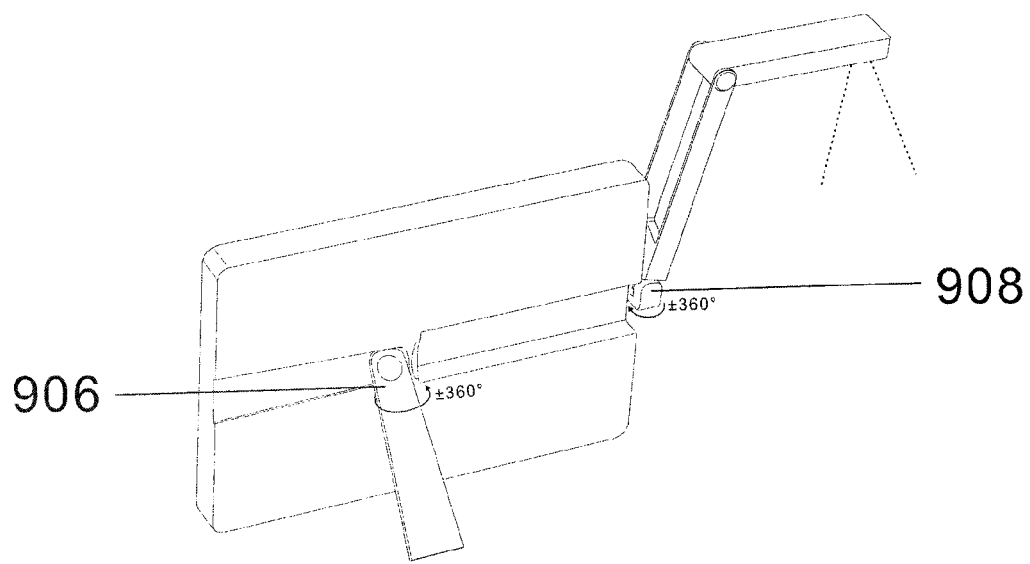
Figure 8C:
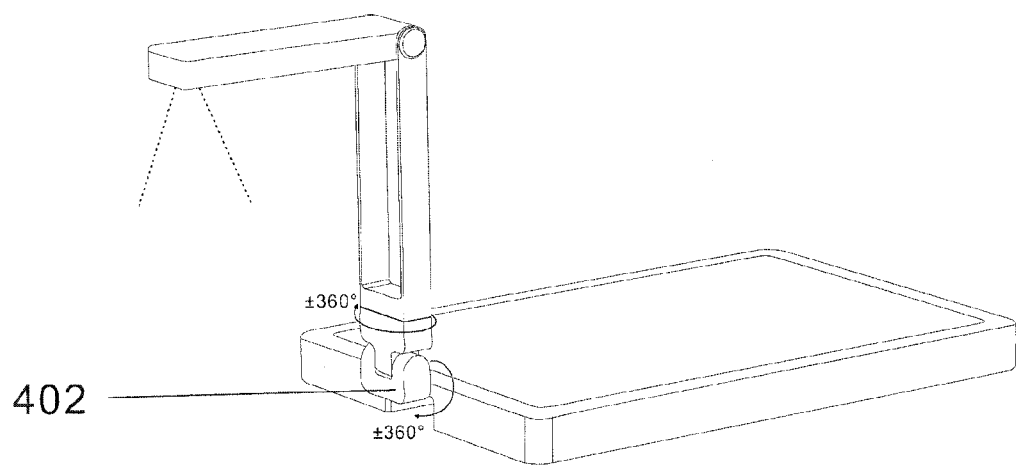
Figure 8D:
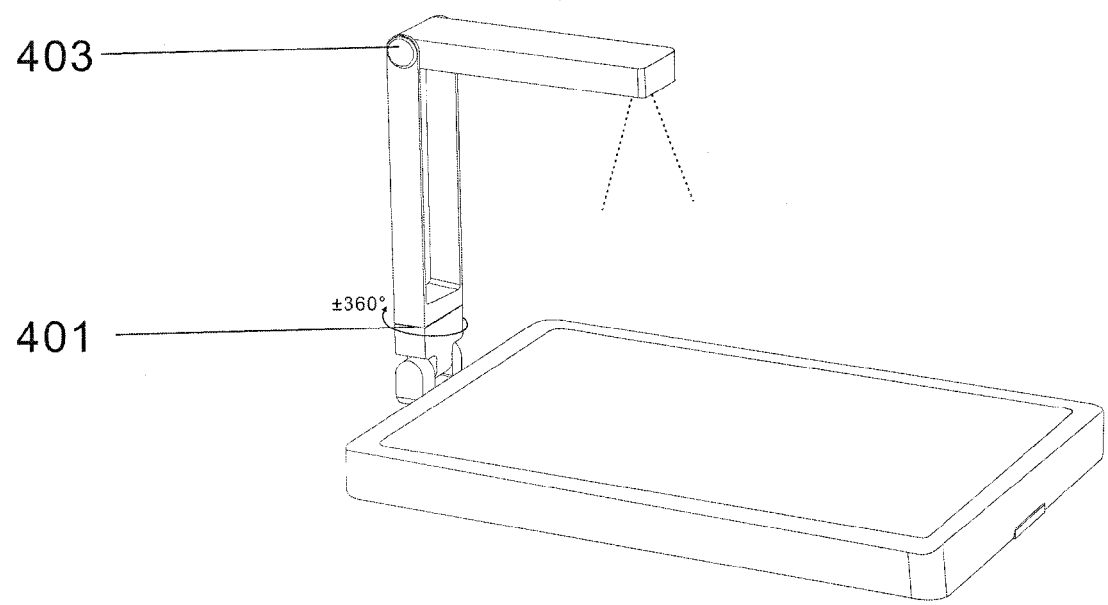

As shown in FIGS. 7b and 8b, the stabilizer 906 provides an arm that the tablet can lean against when sitting relatively upright on a horizontal surface. As shown in FIGS. 8a, 8b, 8c and 8d the tablet is not limited to operating in one configuration. The tablet can be rotated ninety degrees, one hundred and eighty degrees and two hundred and seventy degrees. The screen will remain upright relative to the user.

In any of the embodiments mentioned herein, the imaging device should be a high definition imager. Using a high definition imager should be done along with a dedicated transmitter and a dedicated receiver, which thereby avoids the drawbacks of Wi-Fi bandwidth limitations. Effectively, a point-to-point link is created by the transmitter and the receiver and high volume video data can be transmitted easily without delayed buffering. As will be discussed below, a plurality of point-to-point connections can be made either between two individual tablets, between a network of tablets, between a single tablet and a plurality of tablets or between two groups of tablets. In any connection, transmission speed is not lost because of the dedicated connection between transmitters and receivers in the respective tablets.

In a classroom or lecture environment, there exists an interest in the real-time transfer of handwriting. The above described embodiments can be combined with a writing surface that will both allow a user to see his writing just as if he were writing on a piece of paper or on a white board while simultaneously transferring the writing to a remote location. For example, a teacher in the classroom can monitor what a student is doodling just by connecting a receiving tablet/scanner to a student's tablet/scanner. Alternatively, a remotely located teacher or lecture can review work as a student is writing it on a tablet. Conversely, many students can see a teacher or lecturer's handwriting up close as the teacher or lecturer is writing. FIG. 10 shows what would be a generic classroom configuration using the present scanner and tablet.

Figure 9:
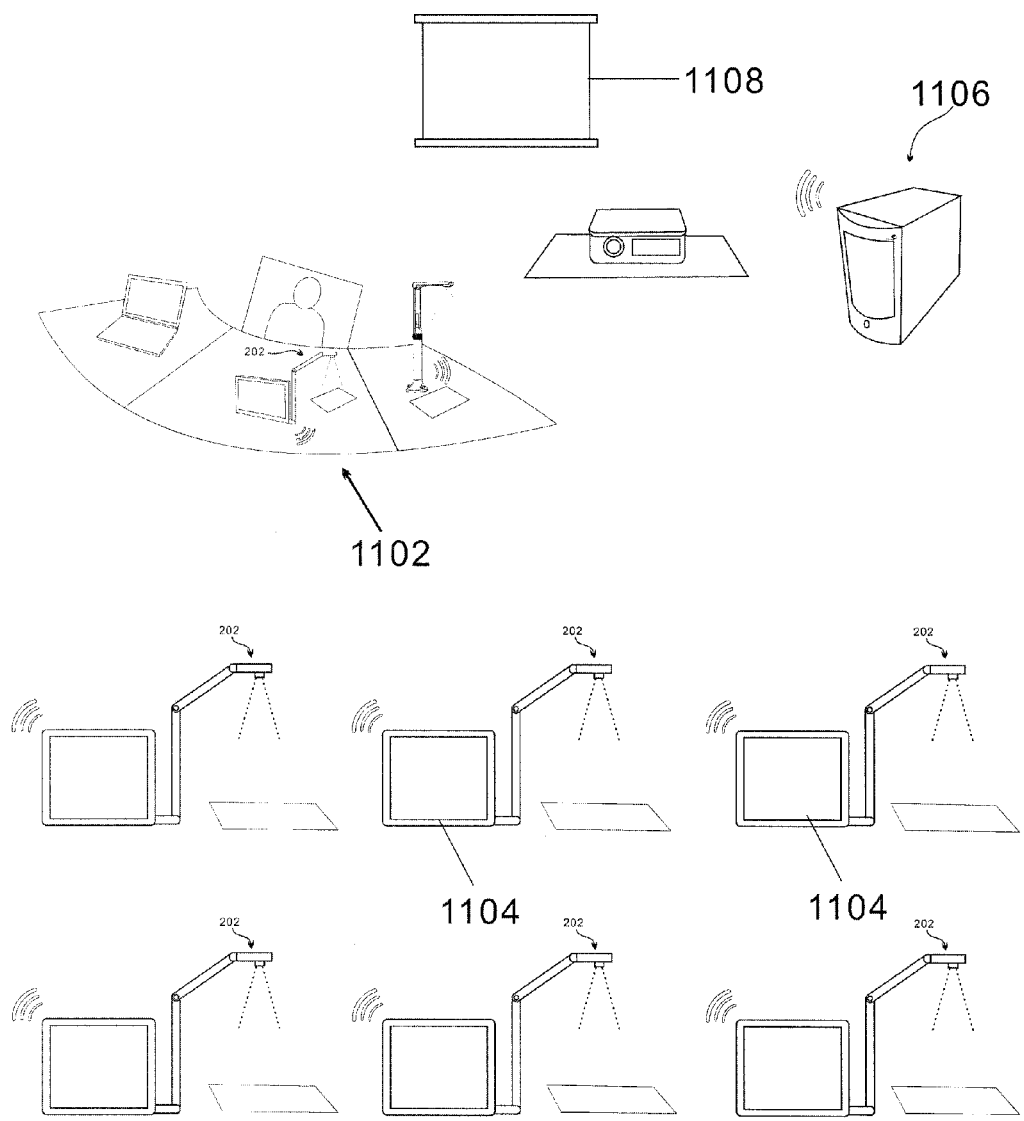
FIG. 9 shows a classroom setting wherein the present system is integrated in a lecture environment.

As shown in FIG. 9, a lecturer can use a lecture tablet 1102 and scanning device 202 to present a lesson or discussion to a group of students in a classroom or lecture hall. Each of the students has a tablet 1104 and scanning device 202. Each tablet can communicate directly with the lecturer's tablet. When a lecturer or student desires to write a handwritten message to another person having a tablet either in the room or at a remote location, the student merely writes a note on the tablet 1104. The scanning device 202, in this case a wireless high definition multimedia imager (HDMI) scans the handwriting and the tablet, through Bluetooth, wireless, cloud computing, etc. scans and transmits an image representing the handwritten indicia to the intended recipient. With wireless HDMI, pressure sensitive tablets and ultrasound scanners are no longer necessary. Two-dimensional or three-dimensional images can be scanned as the HDMI is competent to scan both. Alternatively, a high resolution camera, an infinite focal length lens or a device capable of encoding and decoding 1080P full motion video in various formats in real-time can be used as a part of the scanning device 202. Also, rather than send the indicia to another tablet, a person can send the indicia to a server 1106, which then shows the indicia on a whiteboard 1108. This would be helpful for example in replacing the prior art overhead projector.

The components of this system are able to communicate with and control each other in wireless fashion, with real-time video, audio, and commands, e.g., a teacher's tablet remotely displays and controls a desktop image of a server computer, which allows the teacher to annotate images right on her own tablet while all of the annotation markings immediately appear on a remote whiteboard in realtime through the server and connected projector.

Each tablet is configured to communicate with either a single "teacher's" tablet or with any tablet of a plurality of tablets. The tablets are equipped with Wi-Fi, transmitters and receivers for transmitting and receiving data from a remote tablet.

Examples of uses of the tablet in a classroom environment include: classroom exam administration configuration, a classroom response system, a teacher organizer, a student organizer, a grading console, distance learning, performance assessment and intervention, teacher-student-parent social networking. These uses can be singular or in parallel with conference room or classroom presentation configurations.

In a classroom exam administration configuration, a teacher would provide an exam to students through a central server through the teacher's tablet. Students take the exam by writing either on their student tablet screen or on paper under the high-definition multimedia imager. The student can submit exam answers electronically and instantaneously to the teacher for grading through the student's tablet. This not only saves time and paper, but also enables itemized analyses to show how a class, a student, or even a whole district is performing, which makes early intervention possible if a student or district is underperforming.

In a classroom response system, the teacher displays quiz questions wirelessly from the teacher's tablet. Students get prompted on their tablet to answer with A, B, C, D, etc. Statistics are collected instantly and displayed to the teacher in realtime. This increases engagement and gives immediate feedback to the teacher for improvements.

A tablet community can be formed with the tablets. Software can be included that will allow a teacher, lecturer or any interested person to keep tabs on the performance or feedback of students or an audience. For example, a teacher's tablet can serve as a personal organizer for daily tasks plus show snapshots of student performance in various forms, such as a class grade book, an itemized analysis, a Facebook page, a twitter page, exam editor, homework editor, etc. Similarly, a student, audience member or any other similarly situated person can obtain software that will allow the user to keep tabs on his own performance. For example, a student's tablet can include a student personal organizer for daily tasks, snapshots of individual class work, homework, notes, exams, a grade book, itemized analysis results and recommended enrichment materials. The student's tablet also serves as a personal communications console for remote tutoring, sharing with other students, and communicating with teachers and parents; hence all of the tablets become a social network that can be limited to the holders of each tablet in the system. The benefit would be that the student's performance and engagement would be improved. In an age restricted, identity restricted environment, only students, teachers, and parents would be able to sign on to this online community.

The present system will analyze data collected throughout the whole learning process. Every piece of data that existed in the learning process is collected, on an itemized level, and given to educators as a complete and thorough analysis of every student. Problem areas can then be identified. Various teaching actions can then be reinforced and targeted. And any necessary interventions can be undertaken more quickly than with conventional methods. The analysis might be one of comparison of the student's work relative to a larger group, i.e., entire class, school, nationwide grade level, grade level historically or grade level future projections, etc.

If the tablet is used as a grading console, after student homework or exam papers are collected electronically, from the classroom or from a student's home, teachers can simply grade papers using the tablet as if the homework or exam paper was submitted on regular paper. The built-in high-definition multimedia imager can also capture paper grading results and perform recognition to create grade book entries automatically.

Each tablet will have the ability to record video, through the high-definition multimedia imager, and display video. In a classroom or lecture setting, a teacher will be able to demonstrate presentation materials and the teacher's own image to the students or audience. A plurality of high-definition multimedia imagers can be used so that both an image of the teacher's presentation and an image of the teacher and any other image can all be transmitted selectively. As such, a student can have the option of selecting which view to see on his own tablet. Alternatively, the teacher's or lecturer's tablet can be a master tablet that governs which image the students or audience members are seeing on their tablets. If the tablets are used in a conference room type setting, any tablet can remotely control and share with the central server device, which projects onto a whiteboard screen. Any person or student can take over the presentation. This replaces the panning and re-orientation used in today's video conferencing systems.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

I claim:

1. An imaging device comprising:
a tablet computer comprising a touch sensitive screen, a wireless video transmitter and receiver for transferring video;
a document camera integrated structurally and electronically with the tablet computer, and configured for capturing video;
a flexible arm connecting the tablet computer to the document camera; and
wherein the tablet computer is configured to control image manipulation of video captured from the document camera.

2. An imaging device as recited in claim 1 wherein the tablet computer encodes video captured from the document camera at a resolution of 1080P or higher.

3. An imaging device as recited in claim 1 wherein the flexible arm is extendible.

4. An imaging device as recited in claim 1 further comprising a plurality of buttons including a snap shot button, a home button and an answer button.

5. An imaging device as recited in claim 4 wherein the answer button is configured to capture an image via the document camera.

6. An imaging device as recited in claim 1 further comprising a text recognition component for recognizing text captured by the document camera.

7. An imaging device comprising:
a tablet computer comprising a touch sensitive screen, a wireless video transmitter and receiver for transferring video;
a document camera integrated structurally and electronically with the tablet computer, and configured for capturing video; and
wherein the tablet computer is configured to control image manipulation of video captured from the document camera, wherein the tablet computer comprises a frame and the document camera is retracted and folded into the frame.

8. A group lecture delivery and response system comprising:

a first tablet computer and a plurality of second tablet computers, each of the plurality of second tablet computers having, a transmitter and a receiver;

a respective document camera integrated structurally and electronically with the first tablet computer and each of the plurality of second tablet computers, each of the document cameras is configured for capturing an image of indicia placed on a writing surface within the document camera's focal view, each of the first tablet computer and the second tablet computer is configured to transmit in real-time an image representing the indicia to at least one of the plurality of tablet computer; and wherein the first tablet computer is configured to control image manipulation of a respective image captured at a second tablet computer, and at least one of the plurality of second tablet computers further comprises a flexible arm connecting the second tablet computer to the document camera.

9. A group lecture delivery and response system as recited in claim 8 wherein at least one of the first tablet computer or the second mobile instruments encodes video captured from its document camera at a resolution of 1080P or higher.

10. A group lecture delivery and response system as recited in claim 8 wherein the flexible arm is extendible.

11. A group lecture delivery and response system as recited in claim 8, at least one of the plurality of second tablet computers further comprising a plurality of buttons including a snap shot button, a home button and an answer button.

12. A group lecture delivery and response system as recited in claim 8 wherein the document cameras are configured to capture video.

13. A group lecture delivery and response system as recited in claim 8 further comprising a text recognition component.

14. A group lecture delivery and response system as recited in claim 8 further comprising a bubble sheet recognition and evaluation component.

15. An imaging device comprising:
a tablet computer comprising a touch sensitive screen, a wireless video transmitter and receiver for transferring video;
a document camera integrated structurally and electronically with the tablet computer, and configured for capturing video; and
wherein the tablet computer is configured to control image manipulation of video captured from the document camera, wherein the document camera is folded and embedded into the tablet computer.

16. A group lecture delivery and response system comprising:
a first tablet computer and a plurality of second tablet computers, each of the plurality of second tablet computers having, a transmitter and a receiver;
a respective document camera integrated structurally and electronically with the first tablet computer and each of the plurality of second tablet computers, each of the document cameras is configured for capturing an image of indicia placed on a writing surface within the document camera's focal view, each of the first tablet computer and the second tablet computer is configured to transmit in real-time an image representing the indicia to at least one of the plurality of tablet computer; and
wherein the first tablet computer is configured to control image manipulation of a respective image captured at a second tablet computer, wherein a respective document camera is folded and embedded into its tablet computer.

* * * * *